United States Patent [19]

Hanke

[11] 4,175,647
[45] Nov. 27, 1979

[54] HYDRODYNAMIC RETARDER FOR VEHICLES, ESPECIALLY FOR MOTOR VEHICLES

[75] Inventor: Hans Hanke, Stuttgart, Fed. Rep. of Germany

[73] Assignee: Daimler-Benz Aktiengesellschaft, Fed. Rep. of Germany

[21] Appl. No.: 886,120

[22] Filed: Mar. 13, 1978

[30] Foreign Application Priority Data

Mar. 12, 1977 [DE] Fed. Rep. of Germany ....... 2710927

[51] Int. Cl.² ...................... F16D 57/04; F16D 65/78
[52] U.S. Cl. ........................................ 188/274; 60/337; 60/339; 60/357; 188/264 B; 188/296; 192/113 B
[58] Field of Search ........... 188/274, 290, 296, 264 E, 188/264 F, 264 B; 60/336, 337, 339, 357, 378; 192/113 B

[56] References Cited

U.S. PATENT DOCUMENTS

| | | | |
|---|---|---|---|
| 3,684,335 | 8/1972 | Franke et al. | 188/264 B X |
| 3,774,735 | 11/1973 | Hanke et al. | 188/296 |
| 3,888,335 | 6/1975 | Hanke | 188/296 X |

FOREIGN PATENT DOCUMENTS

| | | | |
|---|---|---|---|
| 75384 | 2/1960 | Fed. Rep. of Germany | 188/296 |
| 391517 | 4/1975 | United Kingdom | 188/296 |

*Primary Examiner*—George E. A. Halvosa
*Attorney, Agent, or Firm*—Craig and Antonelli

[57] ABSTRACT

A hydrodynamic retarder for vehicles, especially for motor vehicles, with an internal working circulation within a working space having at least one rotating blade wheel and at least one stationary blade wheel, with an external cooling circulation that can be filled by way of a filling and discharge line out of a pressure-medium-actuated filling cylinder and which includes a by-pass or control valve, and with a lubricating line which connects the sealing spaces of the retarder shaft both with the center of the working space as also with a control member of the control valve and with a reservoir tank that is arranged at a higher level than the retarder and is additionally connected with the filling and discharge line by way of a closure valve. A first check valve, opening in the direction toward the working space, is arranged in the connection between the lubricating line and the center of the working space while a second check valve, constructed as a venting valve, is arranged in a connection line disposed between an inlet of the retarder and the reservoir tank. The second check valve opens in the direction toward the retarder inlet of the cooling circulation, and a throttle is provided for controlling the flow through this second check valve.

14 Claims, 4 Drawing Figures

HYDRODYNAMIC RETARDER FOR VEHICLES, ESPECIALLY FOR MOTOR VEHICLES

The present invention relates to a hydrodynamic retarder for vehicles, especially for motor vehicles, with an internal working circulatory system within a working space having at least one rotating and at least one stationary blade wheel, with an external circulatory system that can be filled out of a filling cylinder actuated by a pressure medium by way of a filling and discharge line and which includes a by-pass or control valve, and with a lubricating line which connects the sealing spaces at the retarder shaft both with the center of the working space as also with the control member of the control valve and with a reservoir tank that is arranged at a higher level than the retarder and is additionally connected with the filling and discharge line by way of a closure valve.

Retarders of the aforementioned type are known as such. With these prior art retarders, the vacuum in the working space may rise to a very high value. Consequently, also the power loss increases. The present invention is now concerned with the task to reduce the power loss, that is, to therefore also reduce the possible vacuum in the retarder. Additionally, it is to be avoided by the present invention that at operating conditions with high rotational speeds, air is sucked-in into the retarder center in an uncontrolled manner by way of the seals.

The underlying problems are solved with the retarders of the aforementioned type according to the present invention in that a first check valve, opening in the direction toward the working space, is arranged in the connection between the lubricating line and the center of the working space and a second check valve, constructed as a venting valve, is arranged in a connection between the filling and discharge line and the reservoir tank with the second check valve opening in the direction toward the retarder inlet or the cooling circulation and with the flow through the second check valve being dampened by a throttle.

As a result of the construction according to the present invention, the vacuum in the retarder is decreased in an advantageous manner to a considerably smaller value and is then held at this value so that also the power loss decreases correspondingly. Furthermore, the center pressure in the retarder is equalized with respect to the lubrication system by way of the first check valve.

The present invention prefers a solution according to which the first check valve is adjusted to a higher pressure than the venting valve. Values of about 0.5 bar have been found to be particularly appropriate for the first check valve and values of about 0.3 bar for the venting valve. In this manner, a slight excess pressure occurs in the lubricating line, which assures a good sealing action at the seals and prevents the entry of air or contaminants into the lubricating circulation or into the working circulatory system.

One embodiment according to the present invention is characterized in that the connecting line between the reservoir tank and the retarder inlet in the external cooling circulatory system is arranged so high at the reservoir tank that its discharge orifice is covered by the circulation liquid with a full reservoir tank. In this manner—in addition to the already mentioned throttle—a further limitation of the air quanitity for the venting is attained. Furthermore, by providing a small by-pass line at the by-pass valve which by-passes the latter also with a disengaged brake, it is achieved that also, with a disengaged retarder or brake a very small circulation remains preserved so that the residual power loss can be given off to the coolant—even though it is still only very small in the construction according to the present invention.

The present invention additionally proposes to arrange in the lubricating line a third check valve opening in the direction toward the reservoir tank and to combine this check valve with the closure valve into a common structural unit, whereby the third check valve is appropriately adjusted to a higher value than the first check valve, and whereby the exact adjustment depends approximately on the rated or nominal load of the installed seals. A pressing out of liquid at the seals is avoided in this manner if, for example, at a low rotational speed, the center pressure in the retarder should rise to the filling pressure. The combination of the third check valve with the closure valve produces a structural and spatial simplification.

Accordingly, it is an object of the present invention to provide a hydrodynamic retarder for vehicles, especially for motor vehicles, which avoids by simple means the aforementioned shortcomings and drawbacks encountered in the prior art.

Another object of the present invention resides in a hydrodynamic retarder for vehicles in which the possible vacuum in the retarder is reduced so as to also reduce the power loss.

A further object of the present invention resides in a hydrodynamic retarder for vehicles in which the uncontrolled sucking in of air into the retarder center by way of the seals is avoided or at least minimized under operating conditions at high rotational speeds.

A still further object of the present invention resides in a hydrodynamic retarder for vehicles in which the vacuum in the retarder is lowered to a considerably smaller value.

Another object of the present invention resides in a hydrodynamic retarder for vehicles, which assures a good seal at the various seals thereof and at the same time effectively prevents the entry of air or contaminants into the lubricating or working circulatory systems.

Still another object of the present invention resides in a hydrodynamic retarder for vehicles, which offers a simplification as regards structure and space requirements.

These and other objects, features and advantages of the present invention will become more apparent from the following description when taken in connection with the accompanying drawing which shows, for purposes of illustration only, one embodiment in accordance with the present invention, and wherein.

Figure 1:
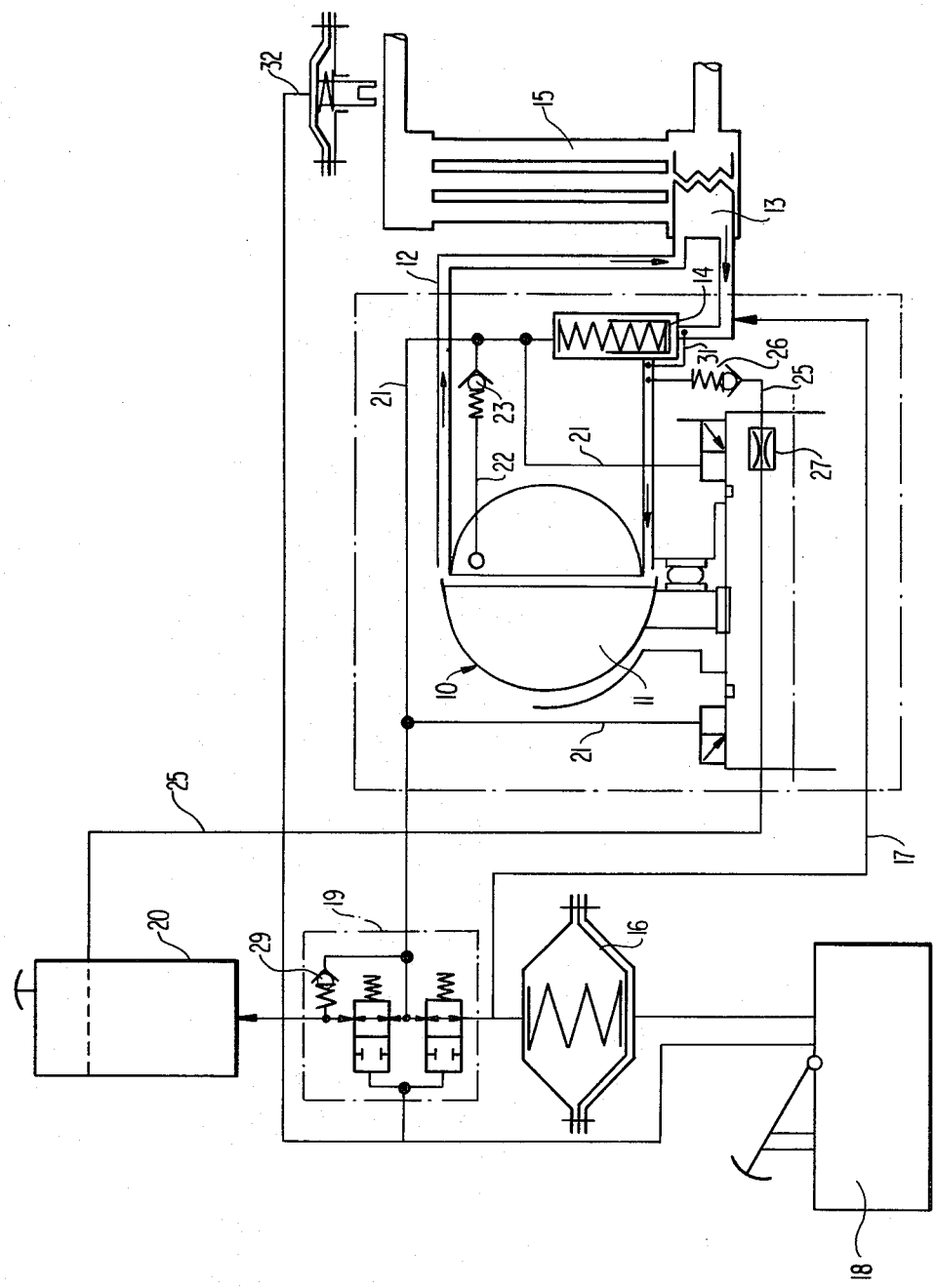
FIG. 1 is a schematic view of the construction of the retarder with a control system in accordance with the present invention.

Referring now to the drawing wherein like reference numerals are used throughout the various views to designate like parts, according to FIG. 1 the retarder generally designated by reference numeral 10 includes an internal working circulatory system within a working space 11 and an external cooling circulatory system 12 in which is arranged a cooler or radiator 13 and a by-pass or control valve 14 which includes a control member for interrupting the external cooling system 12 when the latter is pressureless. The cooler or radiator 13 is integrated into the radiator 15 of the vehicle engine. The retarder 10 can be filled from a storage device 16 which is connected with the cooling circulatory system 12 by way of a filling and discharge line 17. The storage device 16 is actuated from the compressed air reservoir of the vehicle by way of the control valve 18—which can be actuated by a manual brake lever. The storage device 16 is connected with a reservoir tank 20 by way of a closure valve 19; the reservoir tank 20 is located at a higher level than the retarder 10.

A lubricating line 21, connected to the sealing spaces 30 of the retarder 10, is operatively connected with the control member of the by-pass or control valve 14. The lubricating line 21 is also connected by way of a branch line 22 and by way of a first check valve 23 with the center of the working space 11 in the retarder. Furthermore, the lubricating line 21 is operatively connected with the reservoir tank 20 by way of the closure valve 19. The first check valve 23 is adjusted to approximately 0.5 bar. A third check valve 29 by-passes the closure member of the closure valve 19 and is adjusted to about 1.0 to 1.5 bar. The third check valve 29 controls a discharge into the reservoir tank 20.

In proximity of the inlet to the working space 11, a venting line 25 is connected to the external cooling circulatory system 12 with the venting line 25 terminating in the reservoir tank 20 at such a high place that the discharge orifice of the venting line 25 is covered by the liquid with a full reservoir tank 20. A second check valve 26 (venting valve) is arranged in this vent line 25 with the second check valve 26 opening in the direction toward the retarder inlet. A throttle 27 is arranged upstream of this venting valve 26, which limits the air quantity flowing through the venting valve 26.

Figure 2:
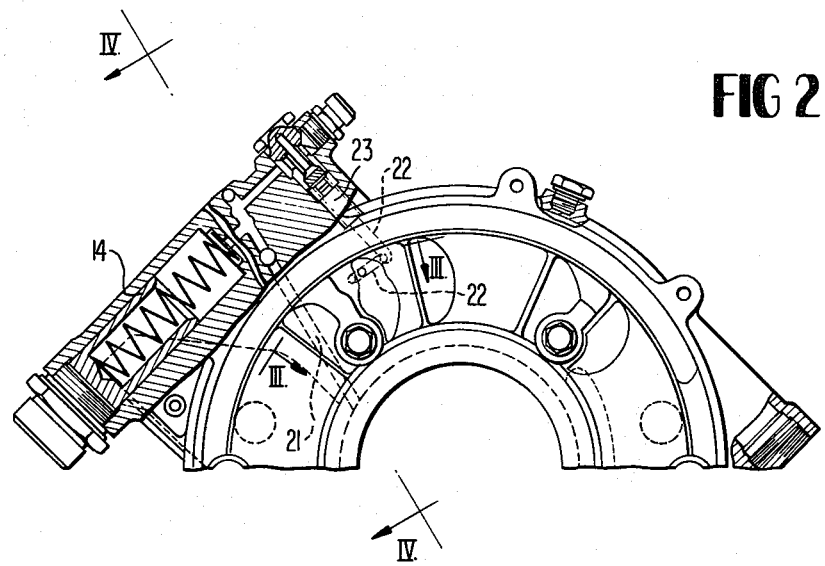
FIG. 2 is a partial cross-sectional view through the retarder in accordance with the present invention.
Figure 3:
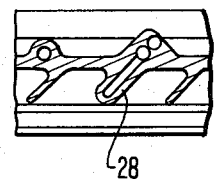
FIG. 3 is a partial cross-sectional view taken along line III—III of FIG. 2.
Figure 4:
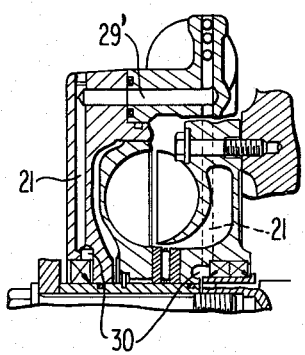
FIG. 4 is a partial cross-sectional view taken along live IV—IV of FIG. 2.

The structural arrangement of the lubricating lines can be readily seen from FIGS. 2 to 4. The line 22 leads from the first check valve 23 (see FIG. 2) to the discharge orifice at the inclined blades 28 (FIG. 3) in the working space of the retarder 10. On the other hand, this check valve 23 is connected with the backside of the by-pass or control valve 14. The lubricating lines 21 also branch off at this place (see especially FIG. 4) which are operatively connected with each other by way of a cross bore 29' and terminate at the sealing spaces 30.

With a disengaged brake and with the engine standing still, the retarder 10 is also filled with oil. Only after the starting of the engine, the retarder 10 is centrifuged empty by the rotation of the rotor. The oil flows through the filling and discharge line 17 into the storage device 16 and into the reservoir tank 20 by way of the open closure valve 19. A vacuum of up to 0.8 bar could result thereby in the working space 11. The venting valve 26 decreases this vacuum to 0.3 bar so that the power loss is correspondingly small. The throttling nozzle 27 thereby assures a limitation and an accurate metering of the air. The discharge orifice of the vent line 25 at the reservoir tank 20 takes care for a further limitation of the air quantity. This is so as with an increasing oil level in the reservoir tank 20 this discharge orifice is covered with oil so that no air can be sucked in any longer.

A by-pass line 31 is provided in the by-pass or control valve 14 so that also with a disengaged brake always a light cooling circulation remains preserved and the slight power loss can be given off to the cooling water. The lubrication takes place by way of the lubricating line 21 out of the reservoir tank 20. The vacuum in the working space 11 sucks off the leakage oil at the bearings and throws it again into the cooling circulation 12 by means of the rotor. From there, it again reaches the lubricating circulation by way of the filling and discharge line 17 as well as by way of the closure valve 19.

The engagement of the brake takes place by actuation of the storage device 16 whereby at the same time the closure valve 19 is closed and the thermostat switch 32 is opened if the latter has not already been opened previously by the heat of the engine cooling water. The cooling circulation 12 and the working space 11 of the retarder are more or less filled from the storage device 16 by way of the filling line 17. The lubrication now takes place in reverse, so to speak of, as during the idling operation. The oil flow out of the retarder 10 into the lubricating line 21 is closed by the check valve 23. However, conversely, the leakage oil must be supplied again to the working circulation at a pressureless place since the volume of the storage device 16 is limited. This takes place by way of the bores 22 leading to the center of the working space. A vacuum of about 0.3 bar establishes itself in the center under the influence of the venting valve 26 above a predetermined rotational speed of, for example, 1100 r.p.m. A slight excess pressure is maintained in the lubricating line by the check valve 23—which opens only at 0.5 bar. This excess pressure prevents at the seals the entry of air and contaminants.

In the rotational speed range below the aforementioned rotational speed, the pressure in the center of the working circulation can rise up to the filling pressure. At such an excess pressure, of course, no oil can be conducted any longer out of the lubricating line 21 into the working space 11. In order to avoid now a pressing out of oil at the sealing rings, the lubricating line 21 is connected with the reservoir tank 20 by way of the third check valve 29. This third check valve 29 is adjusted to a value which corresponds to the rated loading ability of the installed seals and which may be approximately at 1.5 bar.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A hydrodynamic retarder for vehicles, the retarder comprising at least one rotating and at least one stationary blade wheel disposed in a working space means of the retarder, an internal working circulatory system for supplying working fluid to the working space means, an external cooling circulatory system operatively connected to the internal working circulatory system, line means for filling and discharging the cooling circulatory system to and from a filling means, a control valve means for interrupting a flow of the external cooling circulatory system, lubricating line means for operatively connecting sealing spaces at a shaft of the retarder a center of the working space means and also with a control member of the control valve means, and with a fluid reservoir tank, a closure valve means for operatively connecting the reservoir tank with the filling and discharge line means, characterized in that a first check valve means opening in a direction toward the working space means is arranged in a connection portion of the lubricating line means to the center of the working space means, a further line means independent of the lubricating line means for connecting an inlet of the retarder with the reservoir tank, a second check valve means is arranged in the further line means for venting the retarder to the reservoir tank, said second check valve means opening in a direction toward the retarder inlet, and in that a throttle means is arranged in the further line means upstream of the second check valve means for controlling a flow through the second check valve means.

2. A retarder according to claim 1, characterized in that the first check valve means is adjusted to a higher pressure than the second check valve means.

3. A retarder according to claim 2, characterized in that the reservoir tank is arranged at a higher level than the retarder.

4. A retarder according to claim 3, characterized in that the further line means is connected to the reservoir tank at a position such that a discharge orifice of the further line means is covered by fluid in the fluid reservoir tank with a substantially full reservoir tank.

5. A retarder according to claim 1, characterized in that the reservoir tank is arranged at a higher level than the retarder.

6. A retarder according to claim 5, characterized in that the further line means is connected to the reservoir tank at a position such that a discharge orifice of the further line means is covered by fluid in the fluid reservoir tank with a substantially full reservoir tank.

7. A retarder according to claim 1, characterized in that a third check valve means is arranged in the lubricating line means for controlling a flow into the reservoir tank, said third check valve means opening in a direction toward the reservoir tank.

8. A retarder according to claim 7, characterized in that said third check valve means is combined into a common structural unit with the closure valve means.

9. A hydrodynamic retarder for vehicles, the retarder comprising at least one rotating and at least one stationary blade wheel disposed in a working space of the retarder, an internal working circulatory system for supplying working fluid to the working space means, an external cooling circulatory system operatively connected to the internal working circulatory system, line means for filling and discharging the cooling circulatory system to and from a filling means, a control valve means for interrupting a flow of the external cooling circulatory system, lubricating line means for operatively connecting sealing spaces at a shaft of the retarder both with a center of the working space means and also with a control member of the control valve means as well as with a fluid reservoir tank, and a closure valve means for operatively connecting the reservoir tank with the filling and discharge line means, characterized in that a first check valve means opening in a direction toward the working space means is arranged in a connection of the lubricating line means to the center of the working space means, a second check valve means is arranged in a connection line between the filling and discharge line means and the reservoir tank, said second check valve means opening in a direction toward an inlet of the retarder, a throttle means is arranged in the connection line means for controlling a flow through the second check valve means, the first check valve means is adjusted to a higher pressure than the second check valve means, the reservoir tank is arranged at a higher level than the retarder, the connection line means is connected to the reservoir tank at a position such that a discharge orifice of the connection line means is covered by fluid in the reservoir tank with a substantially full reservoir tank, and in that a small by-pass line means is arranged between the retarder inlet and the control valve means for bypassing the control valve means also with a disengaged retarder.

10. A retarder according to claim 9, characterized in that a third check valve means is arranged in the lubricating line means for controlling a flow into the reservoir tank, said third check valve means opening in a direction toward the reservoir tank.

11. A retarder according to claim 10, characterized in that said third check valve means is combined into a common structural unit with the closure valve means.

12. A retarder according to claim 11, characterized in that the filling means is a storage device in the form of a filling cylinder.

13. A hydrodynamic retarder for vehicles, the retarder comprising at least one rotating and at least one stationary blade wheel disposed in a working space of the retarder, an internal working circulatory system for supplying working fluid to the working space means, an external cooling circulatory system operatively connected to the internal working circulatory system, line means for filling and discharging the cooling circulatory system to and from a filling means, a control valve means for interrupting a flow of the external cooling circulatory system, lubricating line means for operatively connecting sealing spaces at a shaft of the retarder both with a center of the working space means and also with a control member of the control valve means as well as with a fluid reservoir tank, and a closure valve means for operatively connecting the reservoir tank with the filling and discharge line means, characterized in that a first check valve means opening in a direction toward the working space means is arranged in a connection portion of the lubricating line means to the center of the working space means, a second check valve means is arranged in a connection line means between the filling and discharge line means and the reservoir tank, said second check valve means opening in a direction toward an inlet of the retarder, a throttle means is arranged in the connection line means for controlling a flow through the second check valve means, and in that a small by-pass line means is arranged between the retarder inlet and the control valve means for bypassing the control valve means also with a disengaged retarder.

14. A hydrodynamic retarder for vehicles, the retarder comprising at least one rotating and at least one stationary blade wheel disposed in a working space of the retarder, an internal working circulatory system for supplying working fluid to the working space means, an external cooling circulatory system operatively connected to the internal working circulatory system, line means for filling and discharging the cooling circulatory system to and from a filling means, a control valve means for interrupting a flow of the external cooling circulatory system, lubricating line means for operatively connecting sealing spaces at a shaft of the retarder both with a center of the working space means and also with a control member of the control valve means as well as with a fluid reservoir tank, and a closure valve means for operatively connecting the reservoir tank with the filling and discharge line means, characterized in that a first check valve means opening in a direction toward the working space means is arranged in a connection of the lubricating line means to the center of the working space means, a second check valve means is arranged in a connection line means between the filling and discharge line means and the reservoir tank, said second check valve means opening in a direction toward an inlet of the retarder, a throttle means is arranged in the connection line means for controlling a flow through the second check valve means, a third check valve means is arranged in the lubricating line means for controlling a flow into the fluid reservoir tank, said third check valve means opening in a direction toward the reservoir tank, and in that a small bypass line means is arranged between the retarder inlet and the control valve means for bypassing the control valve means also with a disengaged retarder.

* * * * *